March 15, 1966 H. J. HUMMEL 3,241,073

IMPULSE NOISE BLANKER FOR AM RADIOS

Filed Dec. 21, 1962

INVENTOR.
Harry J. Hummel

BY Mueller & Aichele

Attys.

United States Patent Office 3,241,073

Patented Mar. 15, 1966

3,241,073

IMPULSE NOISE BLANKER FOR AM RADIOS

Harry J. Hummel, West Chicago, Ill., assignor to Motorola, Inc., Chicago, Ill., a corporation of Illinois Filed Dec. 21, 1962, Ser. No. 246,487
8 Claims. (Cl. 325—473)

This invention relates to blanking circuits in general and more particularly to an improved pulse noise blanking circuit for use in radio communications receivers.

It is well known that impulse noise disturbances superimposed upon a carrier wave signal can severely impair the translation of that carrier signal within a radio receiver. The problem is particularly important in mobile communications equipment which is subjected to ignition impulse interference, lightning flashes and the like. Such high impulse energy, on being coupled to the highly selective communications receiver, appears as undesirable noise or static in the audio output. Various systems have been incorporated in communications receivers to eliminate the effects of such impulse disturbances. An example of such systems is described and claimed in Patent No. 2,901,601, issued to Roy A. Richardson and Jona Cohn on August 25, 1955, and assigned to the present assignee.

The impulse noise disturbances caused by automotive ignition systems varies markedly from vehicle to vehicle. It has been found, however, that typically during the firing of an individual spark plug for a given vehicle a burst or train of impulses is produced, with the burst having a duration in the order of 1–2 milliseconds and noise impulses occurring within the burst at a frequency in the order of several hundred kilocycles. In impulse blanking circuits of the above mentioned type, individual impulse noise disturbances are amplified, detected, filtered and shaped, and applied as a blanking pulse to a subsequent stage of the receiver to effect removal of corresponding disturbances in the translated wave. A prolonged burst of such noise impulse disturbances tends to reduce the overall gain of the receiver in proportion to the repetition rate of pulses within the burst until a predetermined rate or 100 percent duty cycle is reached, at which time the receiver is completely blanked. This blanking action in turn produces amplitude modulation of the received wave at a frequency proportional to the burst repetition rate and of an amplitude proportional to the repetition rate of individual impulses occurring within each burst. It can be readily seen that in instances where the duration of a burst of impulse noise is in the order of one to two milliseconds such amplitude modulation will have an objectionable affect on the audio output of the receiver.

In frequency modulated receivers amplitude modulation of this type will ordinarily present no particular problem since it may be removed by the limiters commonly used in receivers of this type. However, in amplitude modulated receivers, this modulation becomes objectionable when the blanker duty cycle reaches approximately ten percent and remains until the 100 percent duty cycle or complete disabling of the receiver is reached.

It is therefore an object of the present invention to provide an improved impulse noise blanking circuit for radio receivers which has a minimum adverse affect on the signal wave translated by the receiver.

Another object is to provide an improved noise blanking circuit for a radio receiver wherein amplitude modulations produced by blanking in the presence of relatively long duration burst of impulse noise is removed from the translated wave.

A further object of the invention is to provide an improved noise blanking circuit for amplitude modulated receivers, which circuit is particularly adapted to remove amplitude modulation produced by the burst type impulse noise generated by vehicular ignition systems.

A feature of the present invention is the provision of a radio receiver with an impulse noise blanking circuit which includes pulse detection and modulation circuits for generating blanking pulses to interrupt a receiver stage during the occurrence of burst of noise pulse disturbances, and with circuitry to provide a gain modifying signal proportional to the repetition rate of impulses within the noise burst to produce a corresponding increase in the amplitude of the translated wave during such bursts.

Another feature is the provision, in a receiver having such an impulse noise blanking circuit, of circuit means for integrating the noise impulses occurring within a burst of impulse noise to provide a gain control signal, which signal is applied to a subsequent stage of the receiver to remove objectionable amplitude modulations caused by the blanking action during such bursts.

A further feature of the invention is the provision, in an impulse noise blanking circuit of the above type, of integrating, delay, pulse shaping circuit means to produce a control signal of a length corresponding to the duration of a burst of impulse noise and of an amplitude proportional to the repetition rate of blanking pulses produced during the burst. This control signal is applied as an AGC signal to the control electrode of an intermediate frequency stage in the receiver to increase the gain of that stage during the noise burst, thereby compensating for signal reduction produced by the impulse noise blanking in previous stages.

A further feature in an improved noise blanking circuit of the above described type is the provision of a simple and reliable circuit utilizing a minimum of circuit elements to perform the above described functions.

Other objects and features and attending advantages of the invention will become apparent from the following description when taken in conjunction with the accompanying drawings, wherein.

In practicing the invention a radio communications receiver is provided with an impulse noise blanking circuit which detects noise disturbances that may be superimposed on a received carrier signal, and wherein blanking pulses are generated in response thereto to cancel the disturbances at an intermediate point in the receiver. The blanking pulses are further coupled to an integrating circuit to produce a signal having a level proportional to the repetition rate of noise disturbances within a burst of impulse noise, which rate may be sufficient to cause a reduction of the average level of the translated signal, resulting in objectionable "holes" in the modulation envelope of the translated signal. The integrated signal is in the nature of a pulse having a duration substantially the same as the duration of the noise burst and an amplitude proportional to the repetition rate of the noise impulses within the burst. This control pulse is delayed an interval corresponding to the signal delay between the point of initial blanking and of gain compensation, shaped to correspond to the "hole" in the modulation envelope, and applied to an AGC terminal of an IF stage of the receiver to increase the gain thereof for the duration of the noise bursts so that undesirable amplitude modulations are removed therefrom.

Figure 1:
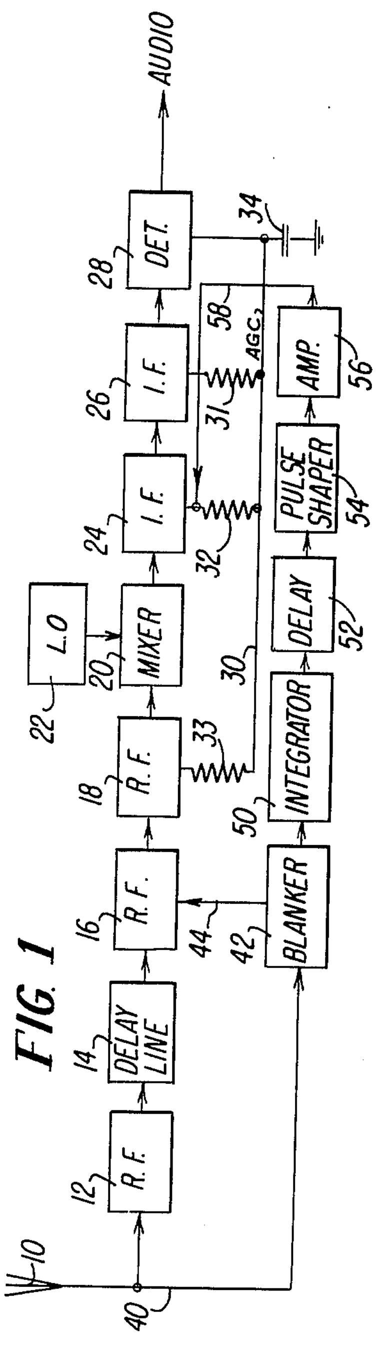
FIG. 1 is a block diagram of a radio receiver incorporating the present invention.

In FIG. 1 there is illustrated in block diagram an amplitude modulated communications receiver with noise blanking means. It is to be understood, however, that the invention is not limited to any particular type of receiver or noise blanker, and may be used with any receiver incorporating impulse noise blanking systems wherein it is desirable to remove amplitude modulations introduced in the translated signal by the blanking action. The blanking may occur, for example, in the RF stages prior to mixing or in the IF stages subsequent to mixing of the incoming signal.

Signals from antenna 10 are coupled to the input of RF amplifier stage 12 and from the output of stage 12 are fed to delay line 14 and then to the input of RF amplifier stage 16. Delay line 14 may consist of a number of lumped parameter circuit elements such as inductors and capacitors which approximate a predetermined length of transmission line, with component values selected to delay the translated signal until a blanking pulse can be applied at the proper time in a subsequent stage. From the output of stage 16 the signal is fed to a further RF stage 18 and then to the input of mixer 20. In the heterodyne type receiver shown, the output of local oscillator 22 is also coupled to mixer 20 and the intermediate frequency signal therein developed is fed through IF stages 24 and 26 to the input of detector 28. The output of detector 28 is further coupled to circuits for utilizing the detected signal, as for example, subsequent audio stages and a loudspeaker.

An automatic gain control signal is derived from detector 28 in the conventional manner and developed on AGC bus to be distributed to IF stages 26 and 24 and RF stage 18 by isolating resistors 31, 32 and 33, respectively. The AGC signal developed on bus 30 provides degenerative feedback to reduce the gain of these stages in response to the amplitude of the detected signal to thereby maintain the output of the receiver substantially constant with signal level variations at antenna 10. Bypass capacitor 34 provides a filtering action to remove undesirable audio frequency and higher frequency signal components which may be superimposed upon the substantially unidirectional gain control signal.

Incoming signals received by antenna 10 are further coupled on lead 40 to the input of blanker circuit 42, wherein undesirable noise impulses superimposed on the incoming carrier wave are detected, amplified and shaped to provide impulse noise blanking pulses. These pulses are coupled on lead 44 to a control electrode of RF stage 16 to thereby disable the stage during such intervals as the undesirable noise impulse is superimposed on the wave translated by stages 12 and delay line 14 to the input of RF stage 16. An example of a circuit for detecting noise impulses and producing shaped blanking pulses in response thereto is shown in the above mentioned Patent No. 2,901,601. Such blanking may be derived from and applied to selected stages prior to detection of the translated wave.

Although the stage being blanked, such as RF stage 16 in FIG. 1, is disabled for a short interval concurring with the width of the noise impulse which is to be removed from the translated signal, due to the energy stored in the tuned circuits employed in receivers of this type the resultant "hole" in the modulation envelope of the translated signal is substantially "filled-in" so that there is no discernible effect in receiver output under many conditions of random noise. However, in the presence of burst-type impulse noise, where there occurs within the burst a large number of closely spaced noise impulses, the net result is to reduce the amplitude of the translated signal for the duration of the burst, and in instances where the duration of the burst is in order of 1–2 milliseconds or more this may result in objectionable modulation of the translated signal.

According to the present invention, such modulation is removed by further coupling the blanking pulses produced by blanking circuit 42 to integrator 50. The integrated blanking pulses are delayed by delay means 52, shaped by pulse shaping circuit 54, and fed to the input of amplifier

56. The output of amplifier 56 is coupled by lead 58 to the AGC terminal of intermediate amplifier stage 24. The signal appearing on lead 58 is in the form of a pulse having a width substantially the same as the duration of the burst of impulse noise and an amplitude proportional to the number of noise impulses occurring within the burst. This pulse is provided with proper polarity to increase the gain of amplifier stage 24 so that the amplitude of the translated signal is increased at such times that the noise burst causes "holes" in the modulation envelope thereof, with the result that the average signal level reduction produced by the blanking action in previous states is compensated for.

Figure 2:
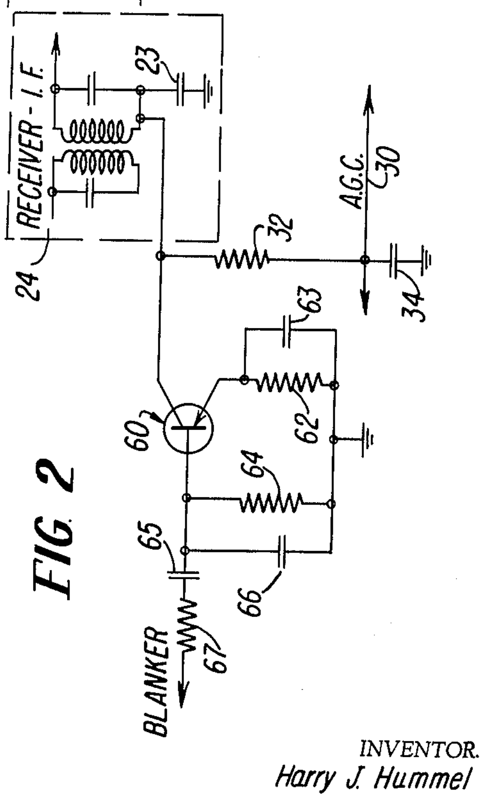
FIG. 2 is a schematic diagram of a particular circuit embodiment for carrying out the invention.

With reference to FIG. 2 a particular circuit embodiment is shown for carrying out the integrating, delay, pulse shaping, and amplification functions of the system of FIG. 1. A nominal bias potential for establishing the quiescent conditions of receiver stages such as stages 18, 24 and 26 is provided on AGC bus 30. This potential may be derived, for example, from detector stage 28 of the receiver in a manner conventional for providing delayed AGC for the receiver.

The quiescent biasing potential appearing on lead 30 is further connected to the collector electrode of transistor 60 from a point common with the gain control terminal of IF stage 24 of the receiver and isolating resistor 32. Emitter resistor 62, bypassed by capacitor 63, and base resistor 64 are connected to ground reference potential to bias transistor 60 to cutoff in the absence of a signal applied to its base electrode. Under these conditions, the collector-to-emitter current path of transistor 60 is essentially an open circuit and the AGC system of the receiver operates in the normal manner.

Pulses from blanking circuit 42 are fed by resistor 67 and capacitor 65 to the base electrode of transistor 60. Capacitor 66, connected from the base electrode of transistor 60 to ground reference potential and shunted by resistor 64, receives a charge with each blanking pulse. With transistor 60 in a cutoff condition a charge is stored by capacitor 66. Resistor 67 determines the charging of time of capacitor 66 and resistor 64 determines its discharge time. By making the discharge time longer than the charging time integration takes place, with the rise time of the integrated signal determined by the ratio of charging time to discharge time.

When the charge stored by capacitor 66 and hence the integrated base voltage supplied to transistor 60 reaches a value which overcomes its base-to-emitter voltage transistor 60 tends to conduct, drawing collector-to-emitter current proportional to integrated blanking pulses appearing at its base electrode. Delay is provided by the time it takes for an integrated signal of a given rise time to produce conduction. This results in a voltage drop across resistor 32 to cause a corresponding change in the gain of IF stage 24. Conduction continues as long as the integrated signal supplied to the base electrode of transistor 60, as determined by the repetition rate of the blanking pulses produced by blanking circuit 42, remains at a level which renders transistor 60 conductive. The change in gain produced by the conduction of transistor 60 compensates for reduction in the magnitude in the translated signal as a result of impulse noise blanking in RF stage 16 in the presence of bursts of impulse noise.

In the specific example shown, a negative potential is supplied on AGC bus 30 and the receiver gain is reduced by further application of a negative potential on lead 30 during normal AGC operation. Increased conduction of transistor 60 tends to place the junction of the gain control terminal of stage 24 and resistor 32 at a potential closer to ground reference potential (decreasing the negative gain control signal supplied thereto) so that the gain of stage 24 increases in the presence of bursts of impulse noise. It is to be understood that other polarities of biasing potential may be used on AGC bus 30, with the polarity of the corrective gain control signal in the presence of impulse noise obtained by the use of proper phase inverting stages or by use of a NPN transistor in place of the PNP device shown for transistor 60.

As previously mentioned, the application of a gain compensating signal to the gain control terminal of stage 24 must be delayed an interval corresponding to receiver delay from point of initial blanking to coincide with the "holes" occurring in the translated signal. This delay may be conveniently obtained by the rise time of the integrated signal at the base electrode of transistor 60 to a level which overcomes its base-to-emitter voltage to cause conduction, as provided by the charging time constant and discharge time constant of resistors 67 and 64 in conjunction with capacitor 65.

Shaping of the control pulse applied to IF stage 24 so as to provide the desired rise and decay times to fill in the "hole" in the translated wave is accomplished in part by the time constants of the integrating circuit at the input of transistor 60, and in part by the time constant of resistor 32 and capacitor 23, as well as the collector impedance of transistor 60.

It is desirable for optimum operation that the AGC characteristics of the amplifying device of IF stage 24 be linear, that is, the percent change in gain be the same for all signal levels. In the instance where stage 24 utilizes a screen grid vacuum tube this linearity may be insured by connecting a neon discharge device between the screen grid and ground, while in the instance where IF stage 24 utilizes a transistor a suitable non-linear device such as a biased diode may be coupled to its input electrode.

The following values have been found useful in the circuit of FIG. 2 when embodied in an AM receiver operating in the "Citizen's Band," and employing a blanking circuit and a screen grid tube in the compensated IF stage:

| | | |
|---|---|---|
| Capacitor **23** | micromicrofarads | 470 |
| Resistor **32** | K ohms | 100 |
| Transistor **60** | | 2N535 |
| Resistor **62** | ohms | 1,000 |
| Capacitor **63** | microfarads | 15 |
| Resistor **64** | ohms | 3,300 |
| Capacitor **65** | microfarads | 15 |
| Capacitor **66** | do | 0.25 |
| Resistor **67** | ohms | 1,500 |

Figure 3:
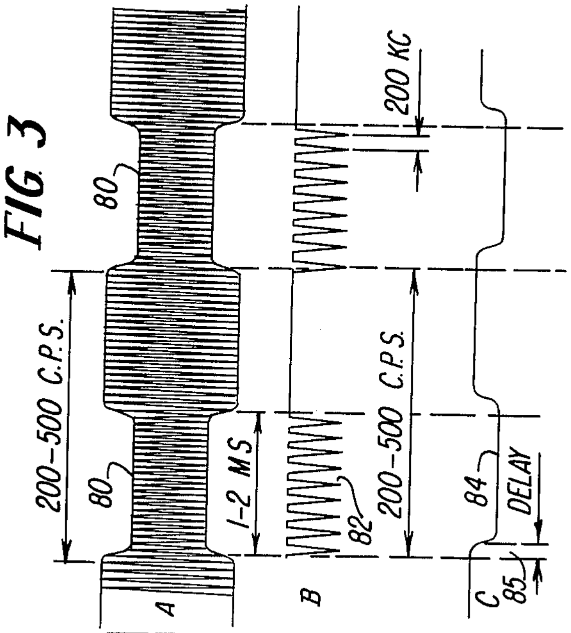
FIG. 3 is a graphic representation of signal waveforms illustrating the operation of the invention.

FIG. 3 illustrates various waveforms useful in portraying the operation of the invention described above. Curve A of FIG. 3 shows a carrier signal with amplitude reductions 80 occurring as a result of blanking action during a burst of impulse noise. As shown, this signal level reduction is periodic (in the order of 200–500 cycles per second) to provide corresponding amplitude modulation of the translated signal. The blanking pulses 82 of curve B are those derived from blanking circuit 42 in response to individual impulses during a burst of impulse noise. As shown, these pulses occur at a relatively high frequency with respect to the repetition rate of the bursts themselves, and may typically be at a frequency in the order of 200 kilocycles. When integarted these high frequency noise impulses produce a series of pulses 84 as shown by curve C. Pulses 84 have an amplitude proportional to the repetition rate of blanking pulses 82 and have their leading and trailing edges shaped to provide a change in gain when applied to the AGC system of the receiver which "fills in" amplitude reductions 80 of the translated signal. A delay is further provided, as shown at 85, to compensate for the delay in the translated signal in going from the point of initial blanking to the point of gain control at IF stage 24.

The invention provides therefore an improved blanking circuit for radio communications receivers, which circuit functions to remove objectionable amplitude modulations introduced by the blanking action in the presence of burst-type impulse noise. By the use of a simple integrating and amplifying stage, with circuit components selected to provide the desired delay and pulse shaping, a control pulse is introduced into the AGC system of the receiver to increase its gain to compensate for reduction in the translated signal which occurs by the blanking action in the presence of burst-type impulse noise. The circuit of the invention is particularly suitable for use with mobile type AM communications receivers where vehicular ignition systems are an especially troublesome source of burst-type impulse noise, may be readily transistorized, and uses a minimum of components.

I claim:

1. In an amplitude modulation receiver for translating a received carrier wave signal which may be accompanied by bursts of impulse noise disturbances, which receiver includes first and second signal translating portions and an input portion for applying received signals thereto, with said first portion having a signal translating stage adapted to be interrupted by the application of blanking pulses thereto and said second portion having a signal translating stage adapted to control the level of the translated signal in response to application of a gain control signal thereto, an impulse noise blanking system including in combination, means coupled to said input portion for providing blanking pulses in response to noise impulses superimposed on said carrier wave signal, means for applying said blanking pulses to said signal translating stage in said first receiver portion, pulse integration means for providing a control signal of a duration corresponding to the duration of said bursts of impulse noise and an amplitude proportional to the number of blanking pulses provided during said bursts of impulse noise, and circuit means for applying said control signal to said signal translating stage of said second receiver portion, whereby said control signal increases the level of said translated signal to compensate for reduction in average amplitude thereof caused by application of said blanking pulses to the signal translating stage of said first receiver portion.

2. An impulse noise blanking system for use in an amplitude modulated receiver having an input portion for receiving a carrier wave signal, which signal may be accompanied by bursts of impulse noise disturbances, a first portion having a signal translating stage adapted to be interrupted by the application of blanking pulses thereto, and a second portion having a signal translating stage adapted to control the level of the translated signal in response to the application of a gain control signal thereto, said impulse noise blanking system including in combination, means coupled to said input portion for producing blanking pulses in response to the noise impulses superimposed on said carrier wave signal, means for applying said blanking pulses to said signal translating stage in said first portion, pulse integration means coupled to said blanking pulse producing means, signal translating means coupled to said pulse integration means, and means coupling the output of said signal translating means to said signal translating stage in said second receiver portion for applying a control signal thereto, with said control signal being in the nature of a pulse having a length corresponding to the duration of said bursts of impulse noise and an amplitude proportional to the number of impulses occurring during such bursts, whereby the level of said translater carrier wave signal is increased during said bursts to compensate for amplitude modulation produced by the blanking pulses applied to said signal translating stage in the first receiver portion.

3. An impulse noise blanking system for use in amplitude modulation receivers having an input portion for receiving a carrier wave signal, which signal may be accompanied by bursts of impulse noise disturbances, a first portion having a signal translating stage adapted to be interrupted by the application of blanking pulses thereto, and a second portion having a signal translating stage adapted to control the level of the translated signal in response to the application of a gain control signal thereto, said impulse noise blanking system including in combination, means coupled to said input portion for producing blanking pulses in response to noise impulses superimposed on said carrier wave signal, means for applying said blanking pulses to said signal translating stage in said first receiver portion, integrating circuit means for providing a control signal of a duration corresponding to the duration of said bursts of impulse noise and an amplitude proportional to the number of blanking pulses produced during said bursts, means coupling said blanking pulses to said integrating circuit means, means for shaping the waveform of said control signal coupled with said integrating circuit means, and delay means coupling said shaped control signal to said signal translating stage of said second receiver portion, whereby said control signal increases the gain of said translated signal to compensate for reduction in the average value thereof produced by blanking pulses.

4. An impulse noise blanking system for use in amplitude modulated receivers having an input portion for receiving a carrier wave signal, which signal may be accompanied by bursts of impulse noise disturbances, a first portion having a signal translating stage adapted to be interrupted by the application of blanking pulses thereto, and a second portion having a signal translating stage adapted to control the level of the translated signal in response to the application of a gain control signal thereto, said impulse noise blanking system including in combination, means coupled to said input portion for producing blanking pulses in response to noise impulses superimposed on said carrier wave signal, means for applying said blanking pulses to said signal translating stage in said first receiver portion, an integrator for providing a gain control pulse of a width corresponding to the duration of said bursts of impulse noise and an amplitude proportional to the number of blanking pulses produced during said bursts, means coupling said blanking pulses to said integrator, amplifier means including pulse shaping means coupling said control pulse to said signal translating stage of said second receiver portion, and delay means coupled with said integrator and said amplifier means, whereby said control pulse increases the gain of said translated wave to compensate for reduction in the average value thereof produced by said blanking pulses.

5. A carrier wave receiver including in combination, a first portion for receiving a carrier wave signal, which signal may be accompanied by bursts of impulse noise disturbances, a second portion having a signal translating stage adapted to be interrupted by application of blanking pulses thereto, a third portion having a signal translating stage with a terminal to receive a gain control signal, means coupled to said first receiver portion for producing impulse noise blanking pulses in response to noise impulses superimposed on said carrier wave signal, means for applying said blanking pulses to said signal translating stage in said second receiver portion, integrating and amplifying means coupled to said blanking pulse producing means, with said integrating and amplifying means providing a control pulse having a length corresponding to the duration of said bursts of impulse noise and an amplitude proportional to the number of noise impulses occurring during said bursts, and means coupling said control pulse to the gain control terminal of the signal translating stage in said third receiver portion, whereby the level of said translated signal is increased during said bursts to compensate for amplitude reduction produced by the blanking pulses applied to the signal translating stage in said second receiver portion.

6. In an amplitude modulation receiver for translating a received carrier wave signal which may be accompanied by bursts of impulse noise disturbances, which receiver includes first and second signal translating portions and an input portion for applying received signals thereto, with said first portion having a signal translating stage adapted to be interrupted by the application of blanking pulses thereto and said second portion having a signal translating stage adapted to control the level of the translated signal in response to the application of a gain control signal thereto, an impulse noise blanking system including in combination, means coupled to said input portion for providing blanking pulses in response to noise impulses superimposed on said carrier wave signal, means for applying said blanking pulses to said signal translating stage in the first receiver portion, signal amplification means having input and output electrodes, pulse integrating means coupled to said input electrode, means coupling said blanking pulses to said pulse integrating means, and means coupling said output electrode to the signal translating stage in said second receiver portion, whereby the amplitude of said translated signal is increased by said integrated pulses to compensate for reduction in the level thereof by said blanking pulses.

7. An impulse noise blanking system for use in amplitude modulation receivers having a first receiver portion for receiving a carrier wave signal, which signal may be accompanied by bursts of impulse noise disturbances, a second portion having a signal translating stage adapted to be interrupted by the application of blanking pulses thereto, and a third portion having a signal translating stage adapted to control the level of the translated signal in response to the application of a gain control signal thereto, said impulse noise blanking system including in combination, means coupled to said first receiver portion for producing blanking pulses in response to noise impulses superimposed on said carrier wave signal, means for applying said blanking pulses to said signal translating stage in said second receiver portion, control pulse forming means including a transistor having input and output electrodes and an integrating circuit connected to the input electrode thereof, means coupling said blanking pulses to said integrating circuit to provide a control pulse at the output electrode of said transistor having a width corresponding to the duration of said burst of impulse noise and an amplitude proportional to the number of blanking pulses produced during said burst, and means coupling the output electrode of said transistor to the signal translating stage of said third receiver portion, whereby the level of said translated wave signal is increased during said bursts to compensate for amplitude reduction produced by the blanking pulses applied to the signal translating stage of said second receiver portion.

8. A carrier wave receiver including in combination, a first portion for receiving a carrier wave signal, which signal may be accompanied by bursts of impulse noise disturbances, a second portion having a signal translating stage adapted to be interrupted by the application of blanking pulses thereto, a third portion having a signal translating stage with a terminal to receive a gain control signal, means coupled to said first receiver portion for producing impulse noise blanking pulses in response to noise impulses superimposed on said carrier wave signal, means for applying said blanking pulses to said signal translating stage in said second receiver portion, a transistor having emitter, collector and base electrodes, means connecting said collector electrode to said terminal of the gain control stage of said third receiver portion, circuit means including resistance means for coupling a bias voltage to said terminal, with said bias voltage further connected to the collector electrode of said transistor, means for biasing said transistor to a cutoff condition, and pulse integrating means coupling the base electrode of said transistor to said blanking pulse producing means, with said integrating means causing said transistor to conduct upon receipt of blanking pulses at a predetermined repetition rate, whereby the output signal appearing at said collector electrode increases the amplitude of said translated signal during bursts of noise to remove amplitude reductions produced by said blanking pulses.

References Cited by the Examiner

UNITED STATES PATENTS

| | | | |
|---|---|---|---|
| 2,151,145 | 3/1939 | Percival | 325—474 |
| 2,152,515 | 3/1939 | Wheeler | 325—474 |
| 2,948,808 | 8/1960 | Neumann et al. | 325—402 |
| 2,981,853 | 4/1961 | Meyer | 307—88.5 |
| 2,987,633 | 6/1961 | Pallas | 307—88.5 |
| 3,007,060 | 10/1961 | Guenther | 307—88.5 |

DAVID G. REDINBAUCH, *Primary Examiner.*

STEPHEN W. CAPELLI, *Examiner.*